US012355579B2

(12) United States Patent
Choi et al.

(10) Patent No.: US 12,355,579 B2
(45) Date of Patent: Jul. 8, 2025

(54) ELECTRONIC DEVICE AND METHOD FOR TRANSMITTING AND RECEIVING DATA WITH RECEPTION ERROR

(71) Applicant: SAMSUNG ELECTRONICS CO., LTD., Suwon-si (KR)

(72) Inventors: Junsu Choi, Suwon-si (KR); Sunkee Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 491 days.

(21) Appl. No.: 17/837,987

(22) Filed: Jun. 10, 2022

(65) Prior Publication Data
US 2023/0020096 A1    Jan. 19, 2023

Related U.S. Application Data

(63) Continuation of application No. PCT/KR2022/006858, filed on May 13, 2022.

(30) Foreign Application Priority Data

Jul. 14, 2021    (KR) .......................... 10-2021-0092118

(51) Int. Cl.
*H04L 1/1867*    (2023.01)
(52) U.S. Cl.
CPC .................................. *H04L 1/189* (2013.01)
(58) Field of Classification Search
CPC ..... H04L 1/189; H04L 1/1614; H04L 1/1809; H04L 1/1848; H04L 1/1893;
(Continued)

(56) References Cited

U.S. PATENT DOCUMENTS

2014/0254349 A1    9/2014 Jia et al.
2018/0213437 A1    7/2018 Li et al.
(Continued)

FOREIGN PATENT DOCUMENTS

CN          106550470        3/2017
KR    10-2006-0016751        2/2006
(Continued)

OTHER PUBLICATIONS

Search Report issued Aug. 11, 2022 in counterpart International Patent Application PCT/KR2022/006858.
(Continued)

*Primary Examiner* — Abdullahi Ahmed
(74) *Attorney, Agent, or Firm* — NIXON & VANDERHYE P.C.

(57)    ABSTRACT

An electronic device may receive aggregated data including a plurality of data blocks via a first link among a plurality of wireless communication links from a second electronic device connected to the electronic device via the plurality of wireless communication links, may transmit information indicating a failure to receive a target block among the plurality of data blocks to the second electronic device via a second link among the plurality of wireless communication links based on reception of the target block failing, and may receive the target block from the second electronic device via the second link.

20 Claims, 10 Drawing Sheets

(58) Field of Classification Search
CPC .... H04L 1/1854; H04W 76/15; H04W 88/02; H04W 28/04; H04W 28/06
See application file for complete search history.

(56) References Cited

U.S. PATENT DOCUMENTS

| | | |
|---|---|---|
| 2019/0082373 A1 | 3/2019 | Patil et al. |
| 2020/0037288 A1 | 1/2020 | Huang et al. |
| 2021/0014811 A1 | 1/2021 | Seok et al. |
| 2021/0045008 A1 | 2/2021 | Bajko et al. |
| 2021/0329697 A1* | 10/2021 | Lee ................... H04W 52/0216 |
| 2022/0014311 A1* | 1/2022 | Chitrakar ............... H04L 5/0055 |
| 2022/0116145 A1* | 4/2022 | Kim ....................... H04W 76/10 |
| 2023/0132228 A1* | 4/2023 | Choi ...................... H04W 28/22 455/574 |
| 2023/0208572 A1* | 6/2023 | Cheong ................ H04L 1/1825 370/328 |
| 2023/0336904 A1* | 10/2023 | Cheong ................ H04R 1/1041 |
| 2023/0403743 A1* | 12/2023 | Kim ................. H04W 74/0816 |
| 2023/0410633 A1* | 12/2023 | Cho ......................... H04W 8/00 |
| 2024/0188106 A1* | 6/2024 | Zhang ................. H04W 40/023 |
| 2024/0267960 A1* | 8/2024 | Cheong ................... H04W 4/80 |

FOREIGN PATENT DOCUMENTS

| | | |
|---|---|---|
| KR | 10-2017-0054218 | 5/2017 |
| KR | 10-2020-0013050 | 2/2020 |
| WO | 2020/112020 | 6/2020 |
| WO | 2020/155108 | 8/2020 |
| WO | 2020/207180 | 10/2020 |
| WO | 2021/002618 | 1/2021 |

OTHER PUBLICATIONS

Hong, Honseul, "Considerations on recovery procedure in Synchronous ML operation," IEEE 802.11-20/1476r0, Apr. 11, 2020, 14 pages.
Li, Yunbo, "Error Recovery for NSTR MLD—Follow up," IEEE 802.11-21/0062r1, Mar. 3, 2021, 12 pages.
Seok, Yongho, "Error Recovery in Synchronous Multiple Frame Transmission," IEEE 802.11-20/1278r1, Apr. 4, 2021, 11 pages.
Extended European Search Report dated Sep. 26, 2024 issued in European Patent Application No. 22842261.4.

* cited by examiner

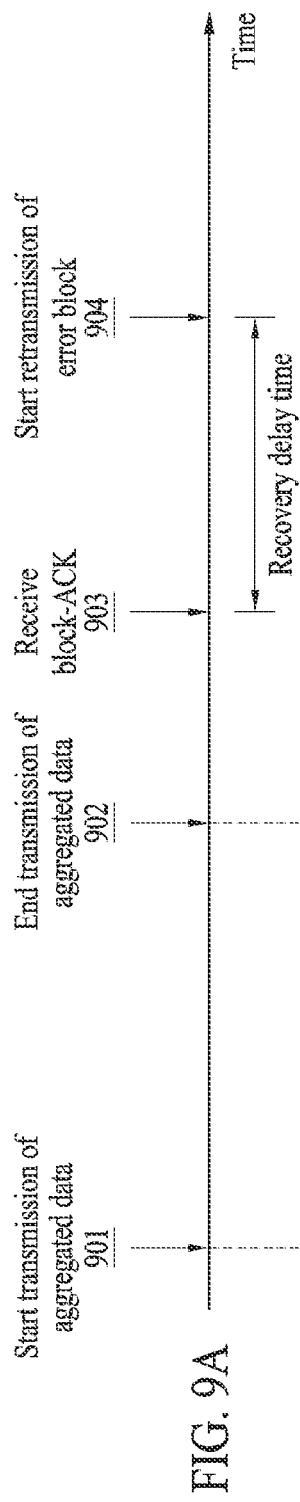
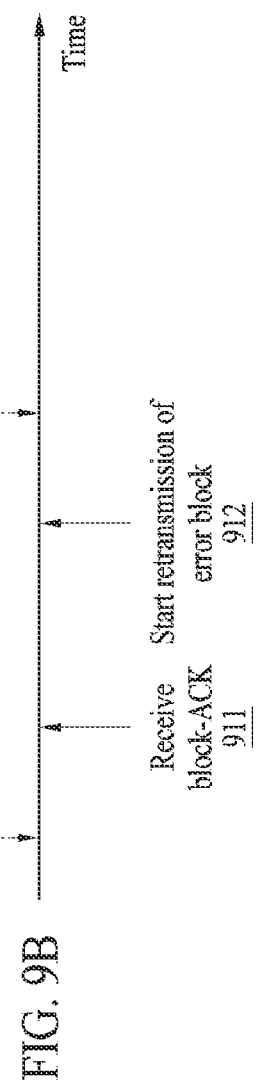
FIG. 9A
FIG. 9B

ELECTRONIC DEVICE AND METHOD FOR TRANSMITTING AND RECEIVING DATA WITH RECEPTION ERROR

CROSS-REFERENCE TO RELATED APPLICATIONS

This application is a continuation of International Application No. PCT/KR2022/006858 designating the United States, filed on May 13, 2022, in the Korean Intellectual Property Receiving Office and claiming priority to Korean Patent Application No. 10-2021-0092118, filed on Jul. 14, 2021, in the Korean Intellectual Property Office, the disclosures of which are incorporated by reference herein in their entireties.

BACKGROUND

1. Field

The disclosure relates to an electronic device for exchanging data via a wireless communication link between electronic devices.

2. Description of Related Art

Recently, various activities of daily living tend to be performed in a non-face-to-face manner. In addition to the non-face-to-face manner, services that interact with an environment in real time, such as augmented reality (AR) and robot control, are attracting much attention as a major future business field in the IT industry. Since the above-described services are based on communication and interaction with various environments (e.g., people or devices), real-time communication and interaction may be a major factor that has an influence on a user experience of services. For services requiring real-time performance, network services such as wireless fidelity (Wi-Fi) and fifth generation (5G) perform key functions in real-time services. Accordingly, along with an increase in demand for real-time services, a demand for low-latency wireless communication technology enabling such real-time services is also increasing.

SUMMARY

If one primary link is present even though one or more wireless communication links are established between electronic devices, a delay time may occur because it is impossible for a reception device to transfer a failure to receive a portion of data via the primary link to a transmission device until transmission of the data is terminated even though an error occurs in the portion of the data.

Embodiments of the disclosure may provide an electronic device for exchanging data via one or more wireless communication links established between electronic devices.

However, the technical aspects are not limited to the aforementioned aspects, and other technical aspects may be present.

According to various example embodiments, an electronic device includes: a communication module comprising communication circuitry configured to exchange data with an external device, and at least one processor operatively connected to the communication module, the at least one processor configured to control the electronic device, wherein through the communication module, the processor is configured to: receive aggregated data via a first link among a plurality of wireless communication links from a second electronic device connected to the electronic device via the plurality of wireless communication links, the aggregated data including a plurality of data blocks, transmit information indicating a failure to receive a target block among the plurality of data blocks to the second electronic device via a second link among the plurality of wireless communication links based on reception of the target block failing, and receive the target block from the second electronic device via the second link.

According to various example embodiments, an electronic device includes: a communication module comprising communication circuitry configured to exchange data with an external device, and at least one processor configured to control the electronic device, wherein through the communication module, the processor is configured to: transmit aggregated data via a first link among a plurality of wireless communication links to a second electronic device connected to the electronic device via the plurality of wireless communication links, the aggregated data including a plurality of data blocks, receive information indicating a failure to receive a target block among the plurality of data blocks from the second electronic device via a second link among the plurality of wireless communication links, and transmit the target block to the second electronic device via the second link.

According to various example embodiments, an electronic device includes: a communication module comprising communication circuitry configured to exchange data with an external device, and at least one processor operatively connected to the communication module, the at least one processor configured to control the electronic device, wherein through the communication module, the processor is configured to: receive aggregated data including a plurality of data blocks from a second electronic device, determine a duration of a session for retransmission of a target block among the plurality of data blocks based on reception of the target block failing, generate information indicating a failure to receive the target block to include information about the duration of the session, transmit the information indicating the failure to receive the target block to the second electronic device, and receive the target block from the second electronic device based on the duration of the session.

According to various example embodiments, an electronic device includes: a communication module comprising communication circuitry configured to exchange data with an external device, and at least one processor configured to control the electronic device, wherein through the communication module, the processor is configured to: transmit aggregated data including a plurality of data blocks to a second electronic device, receive information indicating a failure to receive a target block among the plurality of data blocks and including information about a duration of a session for retransmission of the target block from the second electronic device, and transmit the target block to the second electronic device based on the duration of the session.

According to various example embodiments, an electronic device for exchanging data via one or more wireless communication links established between electronic devices may be provided.

BRIEF DESCRIPTION OF THE DRAWINGS

The above and other aspects, features, and advantages of certain embodiments of the present disclosure will be more apparent from the following detailed description, taken in conjunction with the accompanying drawings, in which:

FIGS. 9A and 9B are timing diagrams illustrating example transmission time in an example of transmitting aggregated data via a plurality of wireless communication links according to various example embodiments.

DETAILED DESCRIPTION

Hereinafter, various example embodiments of the present disclosure will be described with reference to the accompanying drawings. However, this is not intended to limit the present disclosure to specific example embodiments, and it should be understood that various modifications, equivalents, and/or alternatives of the embodiments of the present disclosure are included.

Figure 1:
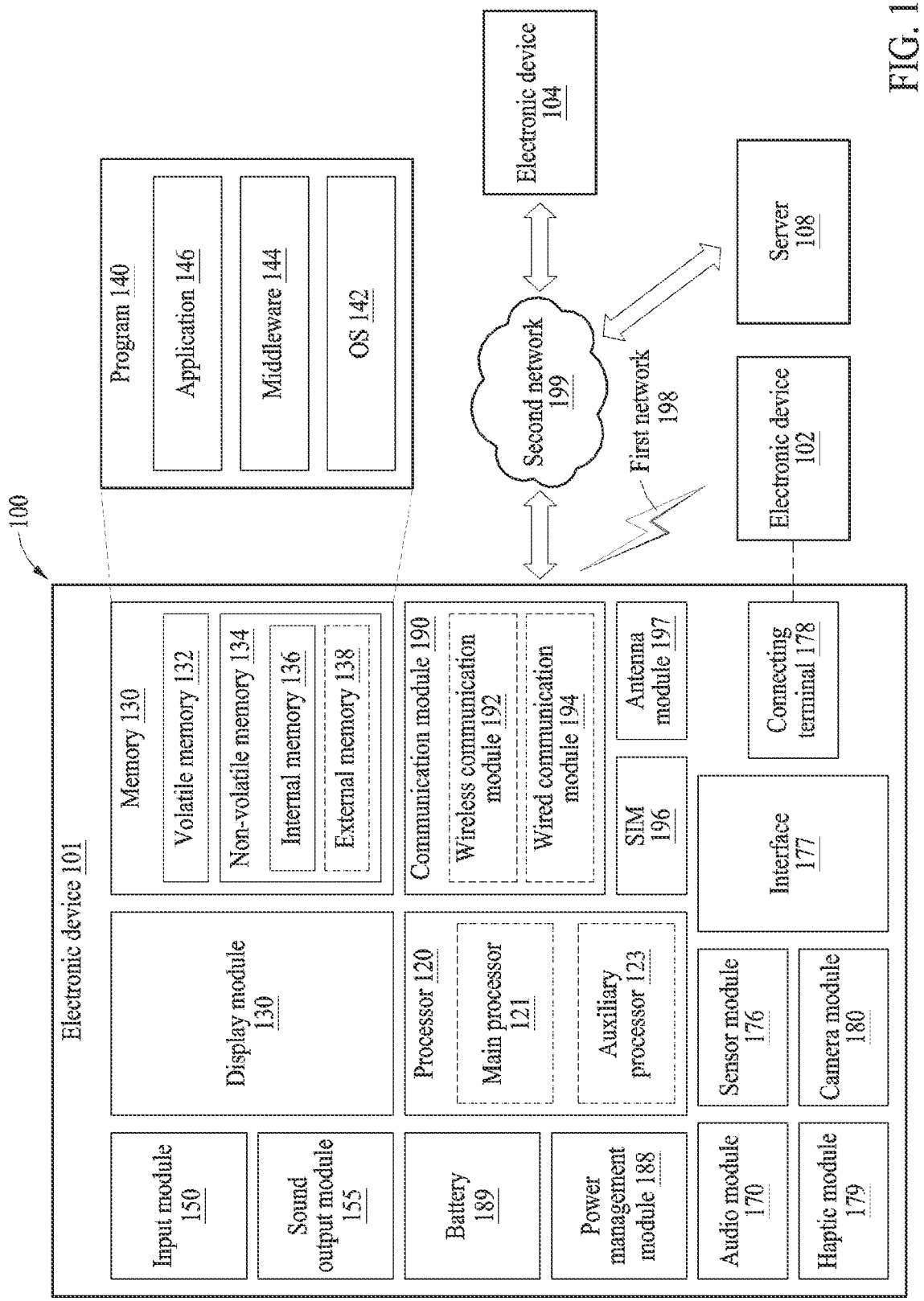
FIG. 1 is a block diagram illustrating an example electronic device in a network environment according to various example embodiments.

FIG. 1 is a block diagram illustrating an example electronic device in a network environment according to various example embodiments.

FIG. 1 is a block diagram illustrating an electronic device 101 in a network environment 100 according to various example embodiments. Referring to FIG. 1, the electronic device 101 in the network environment 100 may communicate with an electronic device 102 via a first network 198 (e.g., a short-range wireless communication network), or communicate with at least one of an electronic device 104 or a server 108 via a second network 199 (e.g., a long-range wireless communication network). According to an example embodiment, the electronic device 101 may communicate with the electronic device 104 via the server 108. According to an example embodiment, the electronic device 101 may include a processor 120, a memory 130, an input module 150, a sound output module 155, a display module 160, an audio module 170, and a sensor module 176, an interface 177, a connecting terminal 178, a haptic module 179, a camera module 180, a power management module 188, a battery 189, a communication module 190, a subscriber identification module (SIM) 196, or an antenna module 197. In various example embodiments, at least one (e.g., the connecting terminal 178) of the above components may be omitted from the electronic device 101, or one or more other components may be added in the electronic device 101. In various example embodiments, some (e.g., the sensor module 176, the camera module 180, or the antenna module 197) of the components may be integrated as a single component (e.g., the display module 160).

The processor 120 may execute, for example, software (e.g., a program 140) to control at least one other component (e.g., a hardware or software component) of the electronic device 101 connected to the processor 120, and may perform various data processing or computation. According to an example embodiment, as at least a part of data processing or computation, the processor 120 may store a command or data received from another component (e.g., the sensor module 176 or the communication module 190) in a volatile memory 132, process the command or the data stored in the volatile memory 132, and store resulting data in a non-volatile memory 134. According to an example embodiment, the processor 120 may include a main processor 121 (e.g., a central processing unit (CPU) or an application processor (AP)) or an auxiliary processor 123 (e.g., a graphics processing unit (GPU), a neural processing unit (NPU), an image signal processor (ISP), a sensor hub processor, or a communication processor (CP)) that is operable independently of, or in conjunction with the main processor 121. For example, when the electronic device 101 includes the main processor 121 and the auxiliary processor 123, the auxiliary processor 123 may be adapted to consume less power than the main processor 121 or to be specific to a specified function. The auxiliary processor 123 may be implemented separately from the main processor 121 or as a part of the main processor 121.

The auxiliary processor 123 may control at least some of functions or states related to at least one (e.g., the display module 160, the sensor module 176, or the communication module 190) of the components of the electronic device 101, instead of the main processor 121 while the main processor 121 is in an inactive (e.g., sleep) state or along with the main processor 121 while the main processor 121 is an active state (e.g., executing an application). According to an example embodiment, the auxiliary processor 123 (e.g., an ISP or a CP) may be implemented as a portion of another component (e.g., the camera module 180 or the communication module 190) that is functionally related to the auxiliary processor 123. According to an example embodiment, the auxiliary processor 123 (e.g., an NPU) may include a hardware structure specified for artificial intelligence (AI) model processing. An AI model may be generated by machine learning. Such learning may be performed by, for example, the electronic device 101 in which artificial intelligence is performed, or performed via a separate server (e.g., the server 108). Learning algorithms may include, but are not limited to, for example, supervised learning, unsupervised learning, semi-supervised learning, or reinforcement learning. The AI model may include a plurality of artificial neural network layers. An artificial neural network may include, for example, a deep neural network (DNN), a convolutional neural network (CNN), a recurrent neural network (RNN), a restricted Boltzmann machine (RBM), a deep belief network (DBN), and a bidirectional recurrent deep neural network (BRDNN), a deep Q-network, or a combination of two or more thereof, but is not limited thereto. The AI model may additionally or alternatively include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored as software in the memory 130, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output a sound signal to the outside of the electronic device 101. The sound output module 155 may include, for example, a speaker or a receiver. The speaker may be used for general purposes, such as playing multimedia or playing record. The receiver may be used to receive an incoming call. According to an example embodiment, the receiver may be implemented separately from the speaker or as a part of the speaker.

The display module 160 may visually provide information to the outside (e.g., a user) of the electronic device 101. The display module 160 may include, for example, a control circuit for controlling a display, a hologram device, or a projector and control circuitry to control a corresponding one of the display, the hologram device, and the projector. According to an example embodiment, the display module 160 may include a touch sensor adapted to sense a touch, or a pressure sensor adapted to measure an intensity of a force incurred by the touch.

The audio module 170 may convert a sound into an electric signal or vice versa. According to an example embodiment, the audio module 170 may obtain the sound via the input module 150 or output the sound via the sound output module 155 or an external electronic device (e.g., an electronic device 102 such as a speaker or a headphone) directly or wirelessly connected to the electronic device 101.

The sensor module 176 may detect an operational state (e.g., power or temperature) of the electronic device 101 or an environmental state (e.g., a state of a user) external to the electronic device 101, and generate an electric signal or data value corresponding to the detected state. According to an example embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an example embodiment, the interface 177 may include, for example, a high-definition multimedia interface (HDMI), a universal serial bus (USB) interface, a secure digital (SD) card interface, or an audio interface.

The connecting terminal 178 may include a connector via which the electronic device 101 may be physically connected to an external electronic device (e.g., the electronic device 102). According to an example embodiment, the connecting terminal 178 may include, for example, an HDMI connector, a USB connector, an SD card connector, or an audio connector (e.g., a headphone connector).

The haptic module 179 may convert an electric signal into a mechanical stimulus (e.g., a vibration or a movement) or an electrical stimulus which may be recognized by a user via his or her tactile sensation or kinesthetic sensation. According to an example embodiment, the haptic module 179 may include, for example, a motor, a piezoelectric element, or an electric stimulator.

The camera module 180 may capture a still image and moving images. According to an example embodiment, the camera module 180 may include one or more lenses, image sensors, ISPs, or flashes.

The power management module 188 may manage power supplied to the electronic device 101. According to an example embodiment, the power management module 188 may be implemented as, for example, at least a part of a power management integrated circuit (PMIC).

The battery 189 may supply power to at least one component of the electronic device 101. According to an example embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently of the processor 120 (e.g., an AP) and that support a direct (e.g., wired) communication or a wireless communication. According to an example embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module, or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., a LAN or a wide area network (WAN))). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The wireless communication module 192 may support a 5G network after a 4G network, and a next-generation communication technology, e.g., a new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., a mmWave band) to achieve, e.g., a high data transmission rate. The wireless communication module 192 may support various technologies for securing performance on a high-frequency band, such as, e.g., beamforming, massive multiple-input and multiple-output (MIMO), full dimensional MIMO (FD-MIMO), an array antenna, analog beam-forming, or a large scale antenna. The wireless communication module 192 may support various requirements specified in the electronic device 101, an external electronic device (e.g., the electronic device 104), or a network system (e.g., the second network 199). According to an example embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an example embodiment, the antenna module 197 may include an antenna including a radiating element including a conductive material or a conductive pattern formed in or on a substrate (e.g., a printed circuit board (PCB)). According to an example embodiment, the antenna module 197 may include a plurality of antennas (e.g., array antennas). In such a case, at least one antenna appropriate for a communication scheme used in a communication network, such as the first network 198 or the second network 199, may be selected by, for example, the communication module 190 from the plurality of antennas. The signal or the power may be transmitted or received between the communication module 190 and the external electronic device via the at least one selected antenna. According to an example embodiment, another component (e.g., a radio frequency integrated circuit (RFIC)) other than the radiating element may be additionally formed as a part of the antenna module 197.

According to various example embodiments, the antenna module 197 may form a mmWave antenna module. According to an example embodiment, the mmWave antenna module may include a PCB, an RFIC disposed on a first surface (e.g., a bottom surface) of the PCB or adjacent to the first surface and capable of supporting a designated a high-frequency band (e.g., the mmWave band), and a plurality of antennas (e.g., array antennas) disposed on a second surface (e.g., a top or a side surface) of the PCB, or adjacent to the second surface and capable of transmitting or receiving signals in the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an example embodiment, commands or data may be transmitted or received between the electronic device 101 and the external electronic device 104 via the server 108 coupled with the second network 199. Each of the external electronic devices 102 and 104 may be a device of the same type as or a different type from the electronic device 101. According to an example embodiment, all or some of operations to be executed by the electronic device 101 may be executed at one or more of the external electronic devices 102, 104, and 108. For example, if the electronic device 101 needs to perform a function or a service automatically, or in response to a request from a user or another device, the electronic device 101, instead of, or in addition to, executing the function or the service, may request one or more external electronic devices to perform at least part of the function or the service. The one or more external electronic devices receiving the request may perform the at least part of the function or the service requested, or an additional function or an additional service related to the request, and may transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another example embodiment, the external electronic device 104 may include an Internet-of-things (IoT) device. The server 108 may be an intelligent server using machine learning and/or a neural network. According to an example embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various example embodiments may be one of various types of electronic devices. The electronic device may include, for example, a portable communication device (e.g., a smartphone), a computer device, a portable multimedia device, a portable medical device, a camera, a wearable device, a home appliance device, or the like. According to an example embodiment of the disclosure, the electronic device is not limited to those described above.

It should be appreciated that various example embodiments of the present disclosure and the terms used therein are not intended to limit the technological features set forth herein to particular embodiments and include various changes, equivalents, or replacements for a corresponding embodiment. In connection with the description of the drawings, like reference numerals may be used for similar or related components. It is to be understood that a singular form of a noun corresponding to an item may include one or more of the things, unless the relevant context clearly indicates otherwise. As used herein, "A or B", "at least one of A and B", "at least one of A or B", "A, B or C", "at least one of A, B and C", and "A, B, or C," each of which may include any one of the items listed together in the corresponding one of the phrases, or all possible combinations thereof. Terms such as "first", "second", or "first" or "second" may simply be used to distinguish the component from other components in question, and may refer to components in other aspects (e.g., importance or order) is not limited. It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used in connection with various example embodiments of the disclosure, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an example embodiment, the module may be implemented in a form of an application-specific integrated circuit (ASIC).

Various example embodiments as set forth herein may be implemented as software (e.g., the program 140) including one or more instructions that are stored in a storage medium (e.g., an internal memory 136 or an external memory 138) that is readable by a machine (e.g., the electronic device 101) For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. The "non-transitory" storage medium is a tangible device, and may not include a signal (e.g., an electromagnetic wave), but this term does not differentiate between where data is semi-permanently stored in the storage medium and where the data is temporarily stored in the storage medium.

According to an example embodiment, a method according to various example embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various example embodiments, each component (e.g., a module or a program) of the above-described components may include a single entity or multiple entities, and some of the multiple entities may be separately disposed in different components. According to various example embodiments, one or more of the above-described components may be omitted, or one or more other components may be added. Alternatively or additionally, a plurality of components (e.g., modules or programs) may be integrated into a single component. In such a case, according to various example embodiments, the integrated component may still perform one or more functions of each of the plurality of components in the same or similar manner as they are performed by a corresponding one of the plurality of components before the integration. According to various example embodiments, operations performed by the module, the program, or another component may be carried out sequentially, in parallel, repeatedly, or heuristically, or one or more of the operations may be executed in a different order or omitted, or one or more other operations may be added.

Figure 2:
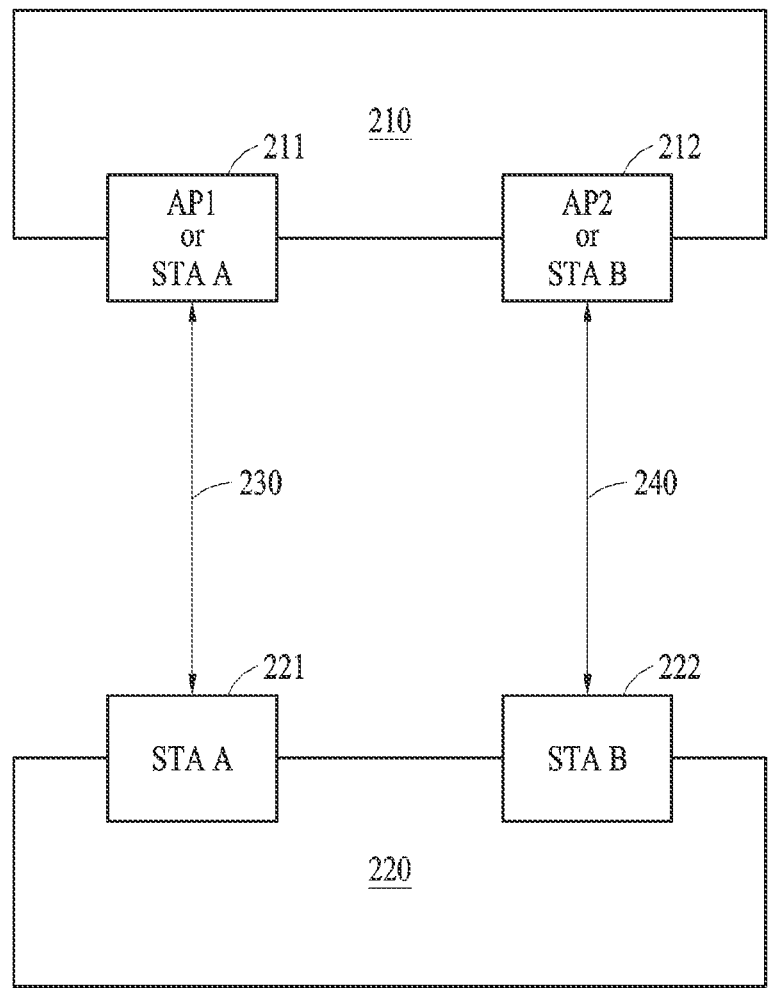
FIG. 2 is a diagram illustrating a plurality of wireless communication links established between electronic devices according to various example embodiments.

FIG. 2 is a diagram illustrating an example of a plurality of wireless communication links established between electronic devices according to various example embodiments.

According to an example embodiment, a plurality of wireless communication links, for example, a first link 230 and a second link 240, may be established between an electronic device 210 (e.g., the electronic device 104 of FIG. 1) and an electronic device 220 (e.g., the electronic device 101 of FIG. 1). For example, the electronic device 210 may include a transmitter configured to transmit data, and the electronic device 220 may include a receiver configured to receive data. Each of the electronic devices 210 and 220 may include a plurality of access points (APs) and/or stations (STAs). APs or STAs in the electronic devices 210 and 220 may be configured as physical devices or may be logically configured. For example, AP1 or STA A 211 in the electronic device 210 may support 5 gigahertz (GHz), and AP2 or STA B 212 may support 6 GHz, however, the example embodiments are not limited thereto. The electronic device 210 including a plurality of APs may be referred to as an "AP multi-link device (MLD)" or "non-AP MLD". The electronic device 220 including a plurality of STAs may be referred to as an "STA MLD" or "non-STA MLD".

According to an example embodiment, the first link 230 (or a first channel) may be established between the AP1 211 of the electronic device 210 and an STA A 221 of the electronic device 220, and the second link 240 (or a second channel) may be established between the AP2 212 of the electronic device 210 and an STA B 222 of the electronic device 220. For example, each of the first link 230 and the second link 240 may be a primary link, and each link may operate independently of an operation with another link. For example, institute of electrical and electronic engineers (IEEE) 802.11be or wireless fidelity (Wi-Fi) 7 may support a technology in which a plurality of primary links are established between the electronic devices 210 and 220 as described above.

A method of establishing a plurality of wireless communication links including the first link 230 and the second link 240 will be described in greater detail below with reference to FIG. 8.

According to an example embodiment, the first link 230 and the second link 240 may be used to exchange data between the electronic devices 210 and 220. For example, aggregated data including a plurality of data blocks may be transmitted and received via the first link 230, and an error data block generated during transmission and reception of the aggregated data may be retransmitted and received via the second link 240. An operation of the first link 230 and an operation of the second link 240 may be performed independently of each other. For example, before data transmission/reception of the first link 230 is completed, at least some erroneous data blocks among the data blocks transmitted via the first link 230 may be retransmitted and received via the second link 240, and thus transmission and reception errors may be quickly recovered. A method of exchanging data through a plurality of wireless communication links will be described in greater detail below with reference to FIGS. 3 to 9B.

Figure 3:
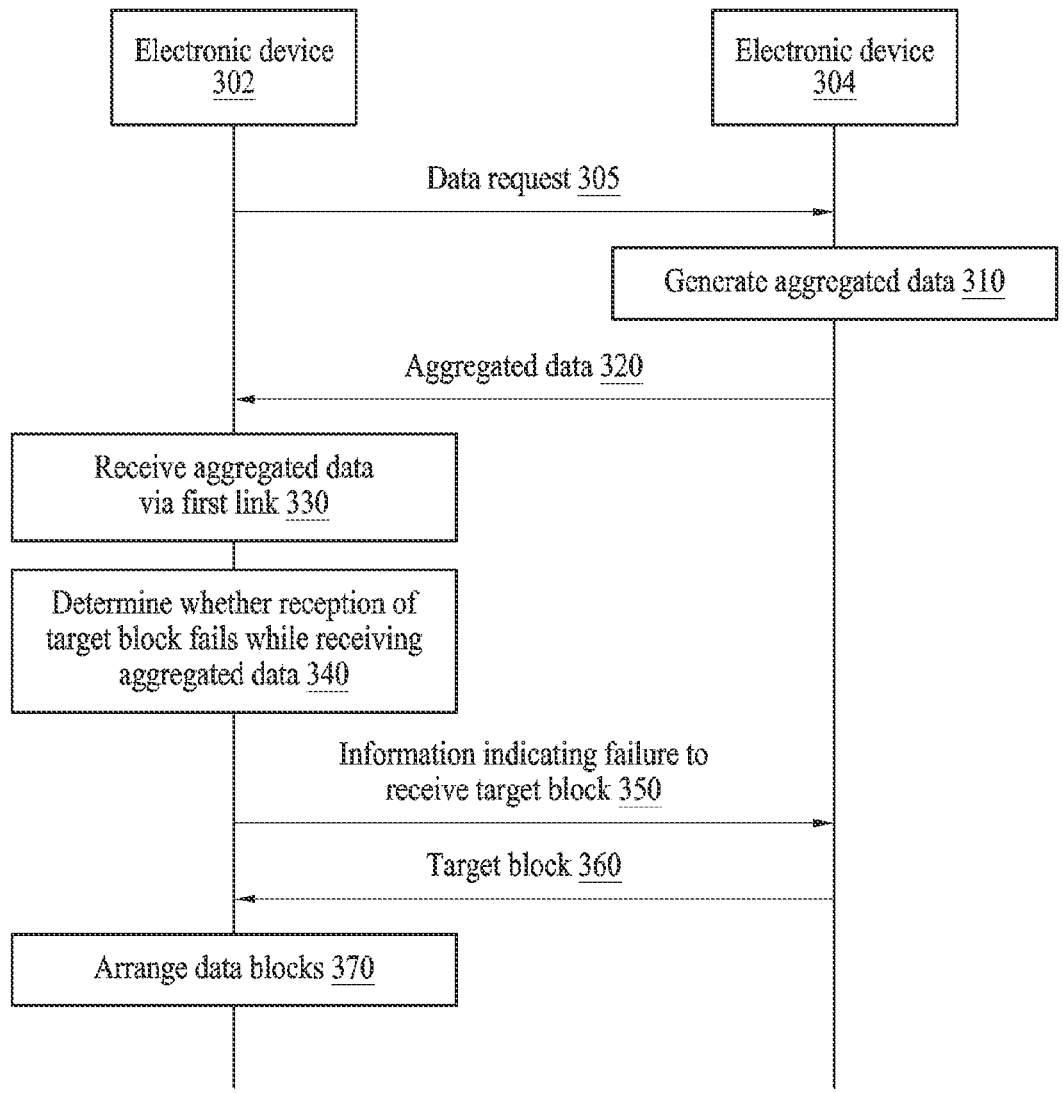
FIG. 3 is a signal flow diagram illustrating an example method of exchanging data between electronic devices via a plurality of wireless communication links according to various example embodiments.

FIG. 3 is a signal flow diagram illustrating an example method of exchanging data between electronic devices via a plurality of wireless communication links according to various example embodiments.

According to an example embodiment, an electronic device 302 (e.g., the electronic device 101 of FIG. 1 or the electronic device 220 of FIG. 2) may include a communication module (e.g., the communication module 190 of FIG. 1 including, e.g., communication circuitry), and a processor (e.g., the processor 120 of FIG. 1 including, e.g., processing circuitry). For example, the electronic device 302 may include, without limitation, one of a mobile communication terminal, a notebook computer, a personal computer (PC), a tablet terminal, a wearable device, a wireless router, or the like. The electronic device 302 may be referred to as a "receiver".

According to an example embodiment, an electronic device 304 (e.g., the electronic device 104 of FIG. 1 or the electronic device 210 of FIG. 2) may include a communication module 190 (e.g., the communication module 190 of FIG. 1 including, e.g., communication circuitry), and a processor (e.g., the processor 120 of FIG. 1 including, e.g., processing circuitry). For example, the electronic device 304 may include, without limitation, one of a mobile communication terminal, a notebook computer, a PC, a tablet terminal, a wearable device, a wireless router, or the like. The electronic device 304 may be referred to as a "transmitter."

According to an example embodiment, operations 305 to 370 may be performed by the electronic devices 302 and 304.

In operation 305, the electronic device 302 may transmit a data request to the electronic device 304. According to an example embodiment, the electronic device 302 may transmit the data request to the electronic device 304 through a first link (e.g., the first link 230 of FIG. 2) among a plurality of wireless communication links established between the electronic devices 302 and 304. For example, data corresponding to the data request may be data requested by a program or an application that is being executed in the electronic device 302.

The electronic device 304 may receive the data request from the electronic device 302 via the first link.

In operation 310, the electronic device 304 may generate aggregated data based on the data request. The aggregated data may include a plurality of data blocks, and the plurality of data blocks may be distinguished according to a preset size or type.

According to an example embodiment, the electronic device 304 may generate a data block in a form of a media access control protocol data unit (MPDU) based on a packet received from an Internet protocol (IP) layer. The electronic device 304 may generate aggregated data in a form of an aggregated MPDU (AMPDU) by aggregating a plurality of MPDUs.

In operation 320, the electronic device 304 may transmit the aggregated data to the electronic device 302. According to an example embodiment, the electronic device 304 may transmit the aggregated data to the electronic device 302 through the first link among the plurality of wireless communication links. For example, a plurality of data blocks in the aggregated data may be sequentially transmitted to the electronic device 302. For example, the plurality of data blocks may be sequentially transmitted based on sequence numbers of the plurality of data blocks, but the example embodiments are not limited thereto.

In operation 330, the electronic device 302 may receive the aggregated data from the electronic device 304 via the first link.

According to an example embodiment, operations 320 and 330 of transmitting and receiving the aggregated data may be performed in parallel with operations 340 to 360. For example, when transmission of a last data block of the aggregated data is completed, operations 320 and 330 may be terminated.

In operation 340, the electronic device 302 may determine whether reception of a target block among the plurality of data blocks fails while receiving the aggregated data. According to an example embodiment, when the aggregated data is in a form of an AMPDU and when data blocks in the aggregated data are in forms of MPDUs, it may be possible to detect a reception error for each of the MPDUs. Since the aggregated data is received through wireless communication, data may not be received normally due to noise or interference. For example, when a plurality of MPDUs are sequentially received, the electronic device 302 may determine whether an MPDU (e.g., a target block) that is completely received is received normally.

When the reception of the target block fails, the electronic device 302 may transmit information indicating a failure to receive the target block to the electronic device 304 via a second link (e.g., the second link 240 of FIG. 2) among the plurality of wireless communication links in operation 350. According to an example embodiment, before the last data block of the aggregated data is received via the first link, the electronic device 302 may transmit the information indicating the failure to receive the target block to the electronic device 304 via the second link.

According to an example embodiment, the information indicating the failure to receive the target block may be a block-acknowledgement (ACK). For example, the information indicating the failure to receive the target block may be in a form of a bitmap.

According to an example embodiment, when the reception of the target block is determined to fail, a request for retransmission of the target block may be immediately transmitted to the electronic device 304. Since the first link is occupied to receive the aggregated data, a request for retransmission of the target block may be immediately transmitted via the second link to the electronic device 304.

The electronic device 304 may receive the information indicating the failure to receive the target block from the electronic device 302 via the second link.

When the electronic devices 302 and 304 negotiate to use a quick recovery protocol, the information indicating the failure to receive the target block may be transmitted from the electronic device 302 to the electronic device 304 via the second link.

In operation 360, the electronic device 304 may transmit the target block to the electronic device 302 via the second link. The electronic device 302 may receive the target block from the electronic device 304 via the second link.

According to an example embodiment, when the reception of the aggregated data via the first link is terminated and when the reception of the target block via the second link is terminated, operation 370 may be performed. For example, when all the data blocks in the aggregated data are determined to be received normally, operation 370 may be performed.

In operation 370, the electronic device 302 may arrange at least one data block received via the first link and the target block received via the second link. According to an example embodiment, the electronic device 302 may arrange at least one data block received via the first link and the target block received via the second link, based on sequence numbers. The at least one data block and the target block may be stored in a memory (e.g., the volatile memory 132 of FIG. 1) of the electronic device 302. By arranging data blocks that are received normally, it may be possible to prevent or reduce a possibility of a data block from being discarded.

According to an example embodiment, the memory of the electronic device 302 may be shared in the first link and the second link. For example, the first link and the second link may share the memory for an access category (AC) or traffic identification (TID) of the aggregated data. Whether to share the memory for a predetermined AC or TID may be determined in a process in which the electronic devices 302 and 304 negotiate whether to use the quick recovery protocol. The memory of the electronic device 302 and a memory of the electronic device 304 shared in the first link and the second link will be described in greater detail below with reference to FIG. 4.

Figure 4:
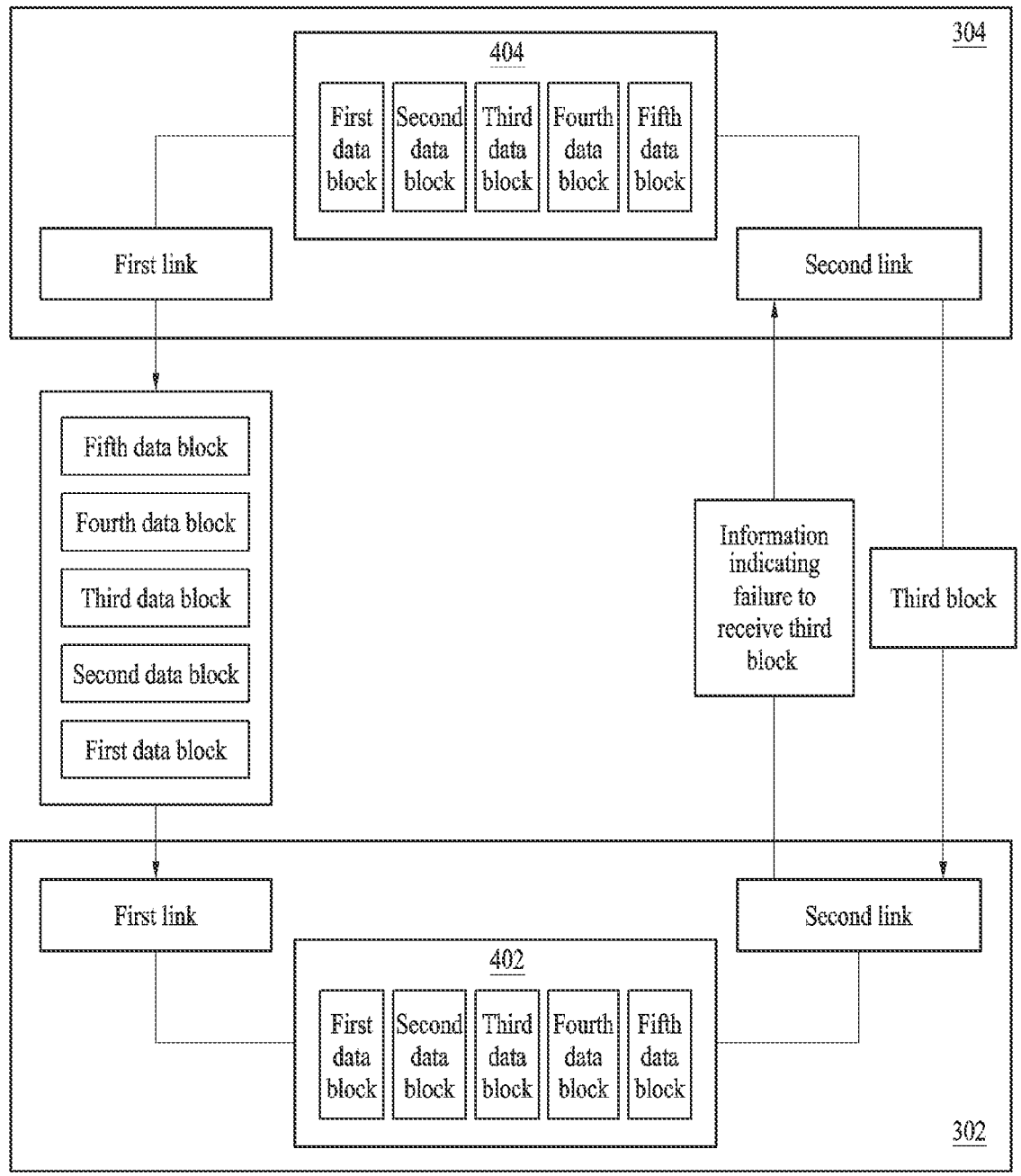
FIG. 4 is a diagram illustrating an example method of exchanging aggregated data between electronic devices via a plurality of wireless communication links according to various example embodiments.

FIG. 4 is a diagram illustrating an example method of exchanging aggregated data between electronic devices via a plurality of wireless communication links according to various example embodiments.

According to an example embodiment, the electronic device 304 may include a memory 404 shared by a first link (e.g., the first link 230 of FIG. 2) and a second link (e.g., the second link 240 of FIG. 2). The memory 404 may store a first data block to a fifth data block included in aggregated data. The electronic device 304 may sequentially transmit the first data block to the fifth data block of the aggregated data to an electronic device 302 via the first link.

According to an example embodiment, the electronic device 302 may include a memory 402 (e.g., the volatile memory 132 of FIG. 1) shared by the first link and the second link. The memory 402 may store a data block that is received normally via the first link. When the first data block and a second data block are received normally via the first link, the memory 420 may store the first data block and the second data block. When, for example, a third data block is not received normally due to an occurrence of an error, the third data block received via the first link may not be stored in the memory 402.

For example, when the third data block is not received normally via the first link, that is, when reception fails, the electronic device 302 may immediately transmit information indicating a failure to receive the third data block to the electronic device 304 via the second link.

When the information indicating the failure to receive the third data block is received from the electronic device 302, the electronic device 304 may identify the third data block in the memory 404 and may transmit the third data block to the electronic device 302 via the second link.

According to an example embodiment, the electronic devices 302 and 304 may transmit and receive a fourth data block and the fifth data block via the first link while transmitting and receiving the third data block via the second link.

The electronic device 302 may store the third data block received via the second link in the memory 402. When reception of the aggregated data via the first link and reception of the third data block via the second link are completed, the electronic device 302 may arrange the data blocks in the memory 402 based, for example, on sequence numbers.

Figure 5:
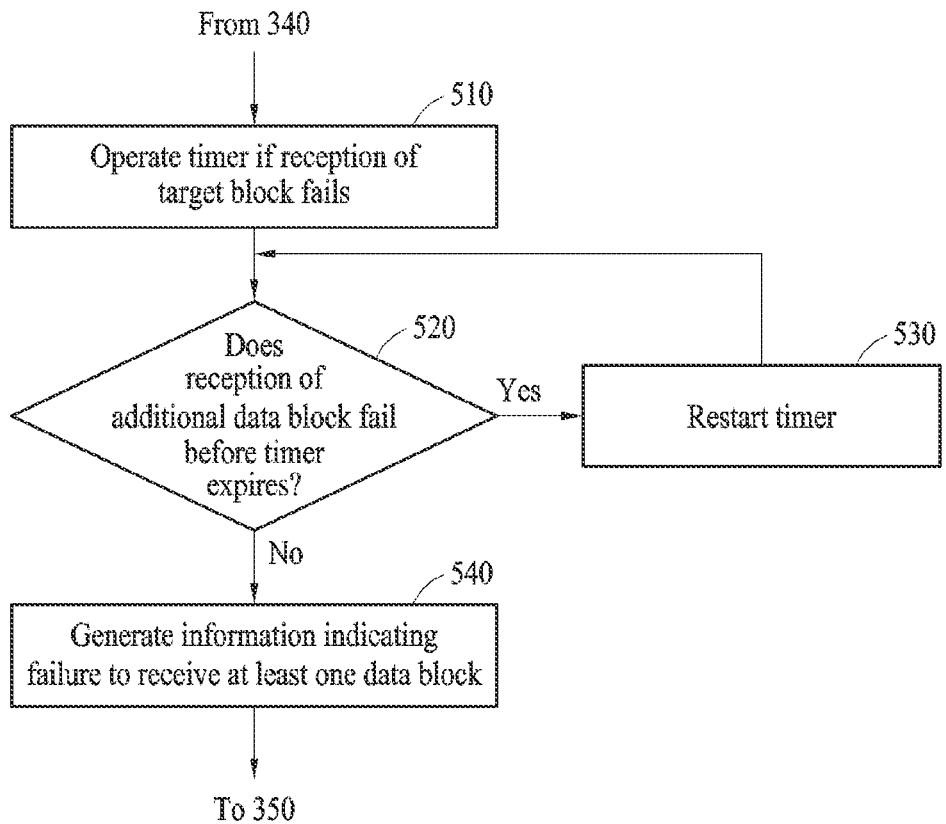
FIG. 5 is a flowchart illustrating an example method of transmitting information indicating a failure to receive a target block to a transmitter via a second link using a timer, according to various example embodiments.

FIG. 5 is a flowchart illustrating an example method of transmitting information indicating a failure to receive a target block to a transmitter via a second link using a timer, according to various example embodiments.

According to an example embodiment, operations 510 to 540 may be further performed after operation 340 of FIG. 3 is performed. Operations 510 to 540 may be performed by the electronic device 302 described above with reference to FIG. 3.

In operation 510, the electronic device 302 may operate a timer if reception of the target block (e.g., the third data block of FIG. 4) fails. A time of the timer may be set in advance. For example, the time of the timer may be set to determine whether reception of a next data block of the target block continues to fail.

In operation 520, the electronic device 302 may determine whether reception of an additional data block (e.g., a second target block) fails before the timer expires.

When the reception of the additional data block is determined to fail before the timer expires (operation 520—Yes), the electronic device 302 may restart the timer in operation 530.

When the reception of the additional data block is determined not to fail before the timer expires (operation 520—No), the electronic device 302 may generate information indicating a failure to receive at least one data block in operation 540. In an example, when reception of the target block only fails, information indicating a failure to receive the target block may be generated. In another example, when reception of the target block and the second target block fails, information indicating a failure to receive the target block and the second target block may be generated.

According to an example embodiment, when reception of a data block other than the target block does not fail before the timer expires, the electronic device 302 may transmit the information indicating the failure to receive the target block to the electronic device 304 via the second link.

According to an example embodiment, when the reception of the target block fails, the electronic device 302 may operate the timer. When the reception of the second target block fails before the timer expires, the electronic device 302 may transmit the information indicating the failure to receive the target block and the second target block to the electronic device 304 via the second link and may receive the target block and the second target block from the electronic device 304 via the second link.

According to an example embodiment, when the reception of the target block fails, the electronic device 302 may operate the timer. When the reception of the second target block fails before the timer expires, the electronic device 302 may restart the timer. When reception of a block other than the target block and the second target block does not fail before the restarted timer expires, the electronic device 302 may transmit the information indicating the failure to receive the target block and the second target block to the electronic device 304 via the second link and may receive the target block and the second target block from the electronic device 304 via the second link.

Figure 6:
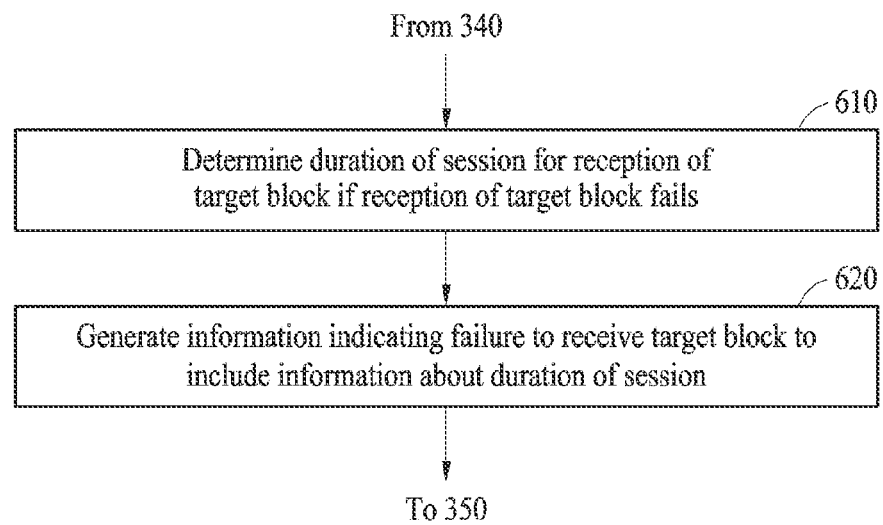
FIG. 6 is a flowchart illustrating an example method of generating information indicating a failure to receive a target block to include information about a duration of a session for retransmission of a target block according to various example embodiments.

FIG. 6 is a flowchart illustrating an example method of generating information indicating a failure to receive a target block to include information about a duration of a session for retransmission of a target block according to various example embodiments.

According to an example embodiment, operations 610 and 620 may be further performed after operation 340 of FIG. 3 is performed. Operations 610 and 620 may be performed by the electronic device 302 described above with reference to FIG. 3.

In operation 610, the electronic device 302 may determine a duration of a session for reception of a target block if the reception of the target block fails.

According to an example embodiment, the electronic device 302 may determine the duration of the session based on at least one of a quantity of data of the target block, a transmission rate of a first link (e.g., the first link 230 of FIG. 2), and a transmission rate of a second link (e.g., the second link 240 of FIG. 2).

For example, the electronic device 302 may acquire the quantity of the data of the target block when a cyclic redundancy check (CRC) is performed. When the quantity of the data of the target block increases, the duration of the session may increase.

For example, when data has been previously transmitted through the second link, the electronic device 302 may determine the transmission rate of the second link based on the data. For example, the electronic device 302 may determine the transmission rate of the second link based on a difference in a received signal strength indication (RSSI) between the first link and the second link. When the transmission rate of the first link or the second link increases, the duration of the session may decrease.

According to an example embodiment, the electronic device 302 may determine at least one of a target modulation coding scheme (MCS) used for retransmission of the target block, a target bandwidth, and a number of target streams.

In operation 620, the electronic device 302 may generate information indicating a failure to receive the target block to include information about the duration of the session. For example, a MAC header of a block-ACK may include the information about the duration of the session.

According to an example embodiment, the electronic device 302 may generate the information indicating the failure to receive the target block so that the information indicating the failure to receive the target block may additionally include information about at least one of the target MCS, the target bandwidth, and the number of target streams.

According to an example embodiment, when the information that indicates the failure to receive the target block and that includes the information about the duration of the session is received, the electronic device 304 may immediately start a session for retransmission of the target block, instead of negotiating with the electronic device 302. Since the session for the retransmission of the target block is immediately started, a delay caused by data retransmission may be reduced.

The session for the retransmission of the target block will be described in greater detail below with reference to FIG. 7.

According to an example embodiment, operations 610 and 620 may be performed together with operations 510 to 540 of FIG. 5. In this example, operations 610 and 620 may be performed after operations 510 to 530 are performed, and operation 540 may be performed after operation 620 is performed.

Figure 7:
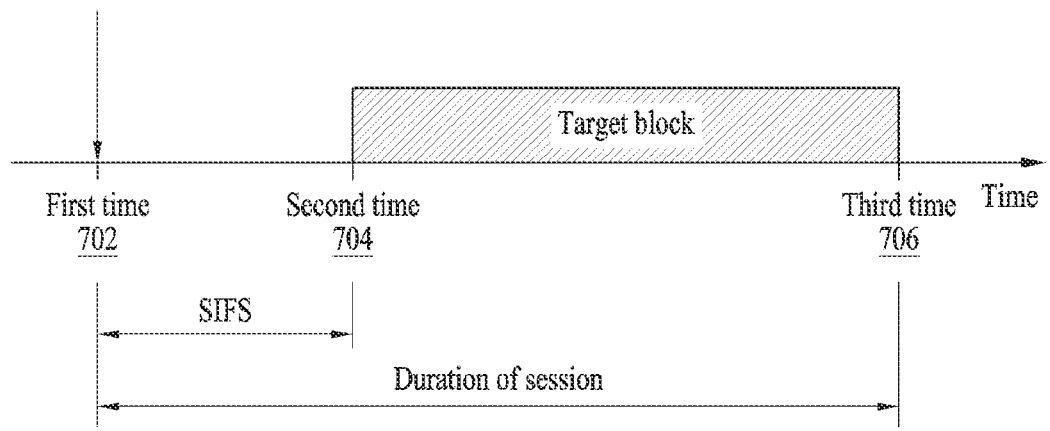
FIG. 7 is a timing diagram illustrating example duration of a session for retransmission of a target block according to various example embodiments.

FIG. 7 is a timing diagram illustrating example duration of a session for retransmission of a target block according to various example embodiments.

According to an example embodiment, the electronic device 304 of FIG. 3 may receive information indicating a failure to receive the target block from the electronic device 302 at a first time 702. For example, the information indicating the failure to receive the target block may include information about a duration of a session for retransmission of the target block. The electronic device 304 may extract the information about the duration of the session from the information indicating the failure to receive the target block.

According to an example embodiment, when a short inter-frame space (SIFS) has elapsed, the electronic device 304 may start retransmission of the target block to the electronic device 302 at a second time 704. For example, the electronic device 304 may transmit the target block to the electronic device 302 via a second link (e.g., the second link 240 of FIG. 2). The electronic device 304 may transmit the target block within a duration of a session designated as a duration from the first time 702 to a third time 706. For example, the third time 706 may be a time (e.g., a fourth time, not shown) before transmission of aggregated data via a first link (e.g., the first link 230 of FIG. 2) is completed. If the third time 706 is earlier than a fourth time, a period of time to transmit all the aggregated data may not increase even though the target block is retransmitted.

According to an example embodiment, the electronic device 304 may transmit the target block to the electronic device 302 based on information about at least one of a target MCS, a target bandwidth, and a number of target streams which are included in the information indicating the failure to receive the target block.

Figure 8:
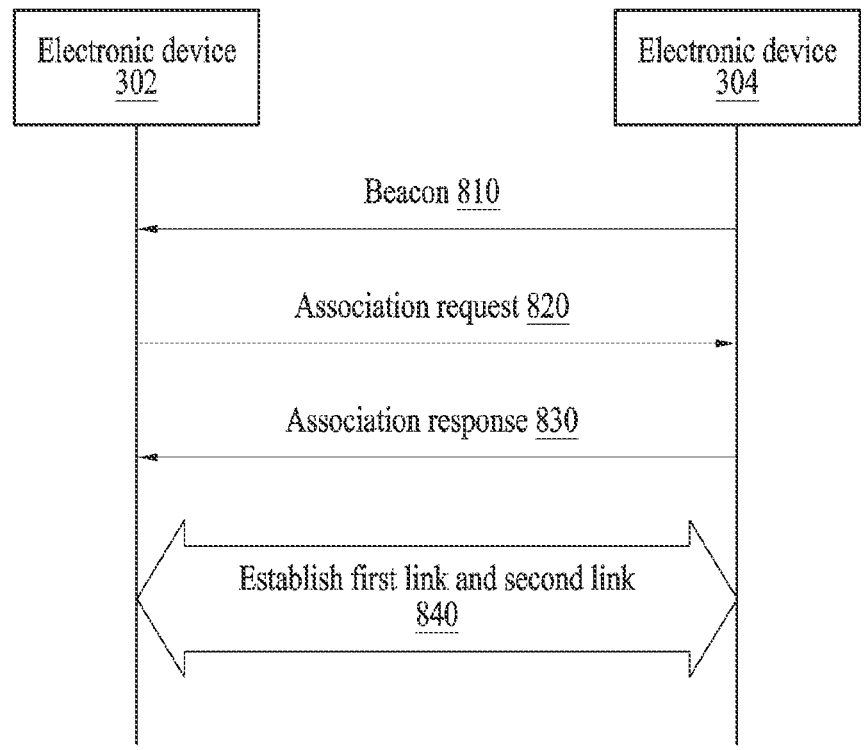
FIG. 8 is a signal flow diagram illustrating an example method of establishing a plurality of wireless communication links between electronic devices according to various example embodiments.

FIG. 8 is a signal flow diagram illustrating an example method of establishing a plurality of wireless communication links between electronic devices according to various example embodiments.

According to an example embodiment, operations 810 to 840 may be performed by the electronic devices 302 and 304 described above with reference to FIG. 3. For example, operations 810 to 840 may be performed before operation 305 of FIG. 3 is performed.

In operation 810, the electronic device 304 may transmit (or propagate) a beacon to a vicinity of the electronic device 304. The electronic device 302 may receive the beacon transmitted by the electronic device 304.

According to an example embodiment, the beacon may include information regarding whether the electronic device 304 supports a function of establishing a plurality of primary links.

According to an example embodiment, the beacon may include information regarding whether the electronic device 304 supports the quick recovery protocol described above with reference to FIG. 3. When the electronic device 304 supports the quick recovery protocol, a data block that has failed to be transmitted via a first link may be retransmitted through a second link.

According to an example embodiment, based on the received beacon, a plurality of links, for example, a first link (e.g., the first link 230 of FIG. 2) and a second link (e.g., the second link 240 of FIG. 2), are established between the electronic devices 302 and 304, the electronic device 302 may determine whether the second link allows retransmission of a data block that has failed to be received via the first link.

In operation 820, the electronic device 302 may transmit an association request to the electronic device 304 based on information included in the received beacon. For example, the electronic device 302 may transmit the association request to the electronic device 304 based on one of a plurality of slots designated so that the electronic device 304 may receive data.

According to an example embodiment, when the electronic device 302 supports the quick recovery protocol, the association request may include information about capabilities of a plurality of links that may be operated by the electronic device 302. For example, the association request may include information of a predetermined AC or TID.

According to an example embodiment, the association request may include a probe request.

In operation 830, the electronic device 304 may transmit an association response corresponding to the association request received from the electronic device 302. For example, the association response may include information about acceptance or rejection of the association request.

According to an example embodiment, the association response may include a probe response.

In operation 840, the first link and the second link may be established between the electronic devices 302 and 304. According to an example embodiment, the first link and the second link may support the quick recovery protocol.

FIGS. 9A and 9B are timing diagrams illustrating example transmission time in an example of transmitting aggregated data via a plurality of wireless communication links according to various example embodiments.

According to an example embodiment, when a quick recovery protocol between a transmitter and a receiver is not supported as shown in FIG. 9A, aggregated data may be transmitted via a first wireless communication link between the transmitter and the receiver during a period of a first time 901 to a second time 902. For example, at a third time 903, the transmitter may receive a block-ACK for an error block from the receiver via the first wireless communication link or a second wireless communication link when the receiver fails to receive at least one data block included in the aggregated data. When the block-ACK is received, the transmitter may retransmit the error block to the receiver via the first wireless communication link or the second wireless communication link at a fourth time 904.

According to an example embodiment, a quick recovery protocol between a transmitter (e.g., the electronic device 210 of FIG. 2 or the electronic device 304 of FIG. 3) and a receiver (e.g., the electronic device 220 of FIG. 2 or the electronic device 302 of FIG. 3) is supported as shown in FIG. 9B, aggregated data may be transmitted via a first wireless communication link (e.g., the first link 230 of FIG. 2) between the transmitter and the receiver during the period of the first time 901 to the second time 902. For example, at a fifth time 911, the transmitter may receive a block-ACK for an error block from the receiver via a second wireless communication link (e.g., the second link 240 of FIG. 2) when the receiver fails to receive at least one data block included in the aggregated data. When the block-ACK is received, the transmitter may retransmit the error block to the receiver at a sixth time 912. In the above example, when retransmission of the error block is terminated earlier than the second time 902, a period of time to transmit the aggregated data may not increase even though the error block is retransmitted.

Figure 10:
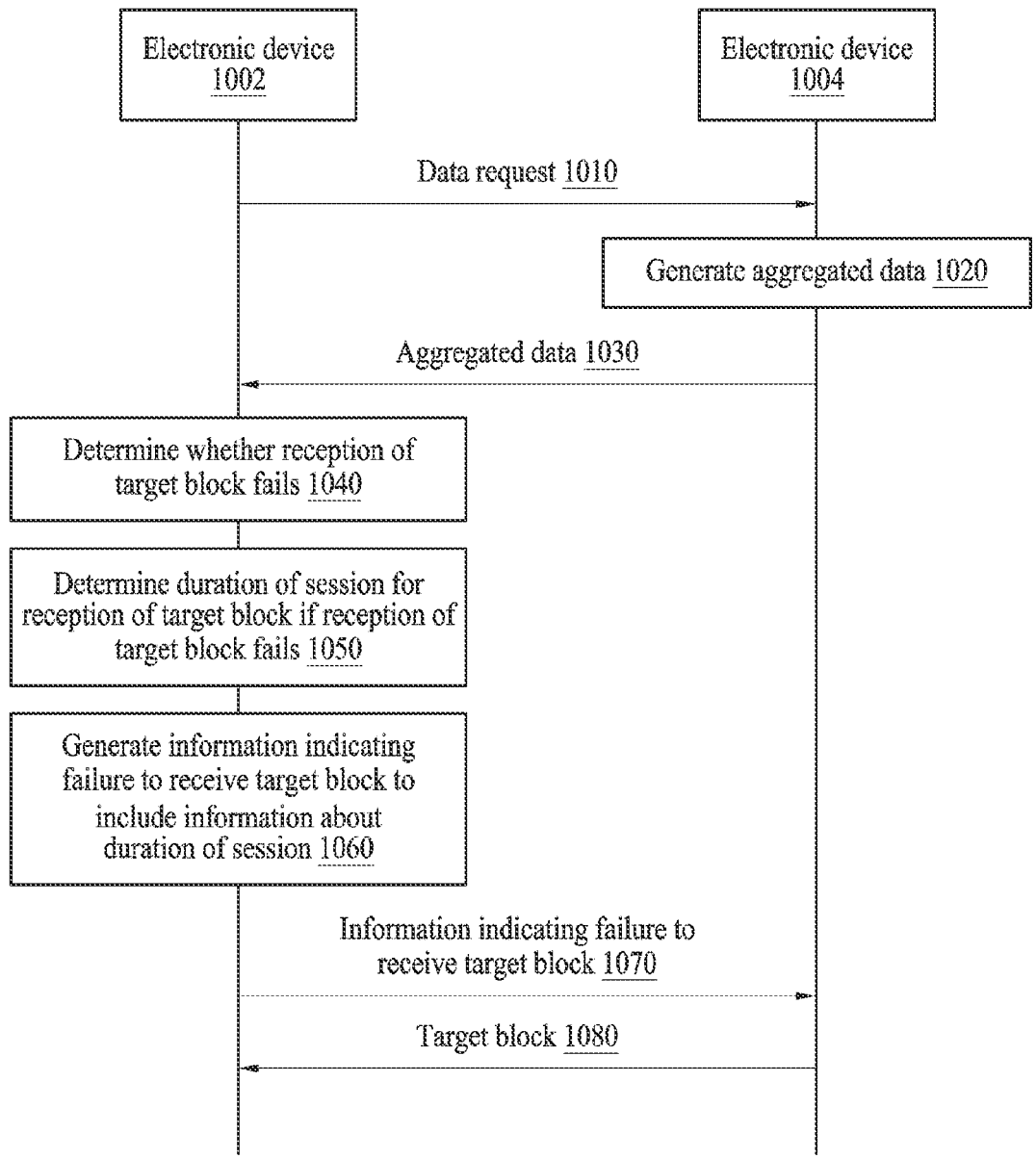
FIG. 10 is a signal flow diagram illustrating an example method of exchanging aggregated data between electronic devices according to various example embodiments.

FIG. 10 is a signal flow diagram illustrating an example method of exchanging aggregated data between electronic devices according to various example embodiments.

According to an example embodiment, an electronic device 1002 (e.g., the electronic device 101 of FIG. 1, the electronic device 220 of FIG. 2, or the electronic device 302 of FIG. 3) may include a communication module (e.g., the communication module 190 of FIG. 1 including e.g., communication circuitry), and a processor (e.g., the processor 120 of FIG. 1 including, e.g., processing circuitry). The electronic device 1002 may include, for example, and without limitation, one of a mobile communication terminal, a notebook computer, a PC, a tablet terminal, a wearable device (e.g., a smart watch), a wireless router, or the like. The electronic device 1002 may be referred to as a "receiver."

According to an example embodiment, an electronic device 1004 (e.g., the electronic device 104 of FIG. 1, the electronic device 210 of FIG. 2, or the electronic device 304 of FIG. 3) may include a communication module (e.g., the communication module 190 of FIG. 1 including, e.g., communication circuitry), and a processor (e.g., the processor 120 of FIG. 1 including, e.g., processing circuitry). The electronic device 1004 may include, for example, and without limitation, one of a mobile communication terminal, a notebook computer, a PC, a tablet terminal, a wearable device (e.g., a smart watch), a wireless router, or the like. The electronic device 1004 may be referred to as a "transmitter."

According to an example embodiment, a single wireless communication link, for example, a first link (e.g., the first link 230 of FIG. 2), may be established between the electronic devices 1002 and 1004.

According to an example embodiment, a plurality of wireless communication links, for example, a first link and a second link (e.g., the second link 240 of FIG. 2) may be established between the electronic devices 1002 and 1004. Although the plurality of wireless communication links may be established between the electronic devices 1002 and 1004, it may be difficult to exchange data using the first link and the second link at the same time if at least one of the electronic devices 1002 and 1004 does not support a quick recovery protocol.

According to an example embodiment, operations 1010 to 1080 may be performed by the electronic devices 1002 and 1004. In an example, the electronic devices 1002 and 1004 may establish a single wireless communication link. In another example, the electronic devices 1002 and 1004 may establish a plurality of wireless communication links, but may not support the quick recovery protocol.

In operation 1010, the electronic device 1002 may transmit a data request to the electronic device 1004. According to an example embodiment, the electronic device 1002 may transmit the data request to the electronic device 1004 via a first link among at least one wireless communication link established between the electronic devices 1002 and 1004. For example, data corresponding to the data request may be data requested by a program or an application that is being executed in the electronic device 1002.

The electronic device 1004 may receive the data request from the electronic device 1002 via the first link.

In operation 1020, the electronic device 1004 may generate aggregated data based on the data request. The aggregated data may include a plurality of data blocks, and the plurality of data blocks may be distinguished according to a preset size or type.

According to an example embodiment, the electronic device 1004 may generate a data block in the form of an MPDU based on a packet received from an IP layer. The electronic device 1004 may generate the aggregated data in the form of an AMPDU by aggregating a plurality of MPDUs.

In operation 1030, the electronic device 1004 may transmit the aggregated data to the electronic device 1002. According to an example embodiment, the electronic device 1004 may transmit the aggregated data to the electronic device 1002 via the first link among the at least one wireless communication link. For example, the plurality of data blocks in the aggregated data may be sequentially transmitted to the electronic device 1002. For example, the plurality of data blocks may be sequentially transmitted based on sequence numbers of the plurality of data blocks, however, the example embodiments are not limited thereto.

The electronic device 1002 may receive the aggregated data from the electronic device 1004 via the first link.

In operation 1040, the electronic device 1002 may determine whether reception of at least one target block among the plurality of data blocks in the aggregated data fails. In an example, during reception of the aggregated data, the electronic device 1002 may determine whether the reception of the target block fails. In another example, after the reception of the aggregated data is completed, the electronic device 1002 may determine whether the reception of the target block fails.

According to an example embodiment, when a data block is in the form of an MPDU, it may be possible to detect a reception error for each MPDU. Since the aggregated data is received through wireless communication, data may not be received normally due to noise or interference. For example, when a plurality of MPDUs are sequentially received, the electronic device 1002 may determine whether an MPDU (e.g., a target block) that is completely received is received normally.

In operation 1050, the electronic device 1002 may determine a duration of a session for the reception of the target block if the reception of the target block fails.

According to an example embodiment, the electronic device 1002 may determine the duration of the session based on at least one of a quantity of data of the target block, a transmission rate of the first link, and a transmission rate of the second link.

For example, the electronic device 1002 may acquire the quantity of data of the target block when a CRC is performed. When the quantity of data of the target block increases, the duration of the session may increase.

For example, when data has been previously transmitted via the second link, the electronic device 1002 may determine the transmission rate of the second link based on the data. For example, the electronic device 1002 may determine the transmission rate of the second link based on a difference in an RSSI between the first link and the second link. When the transmission rate of the first link or the second link increases, the duration of the session may decrease.

According to an example embodiment, the electronic device 1002 may determine at least one of a target MCS used for retransmission of the target block, a target bandwidth, and a number of target streams.

In operation 1060, the electronic device 1002 may generate information indicating a failure to receive the target block to include information about the duration of the session. For example, a MAC header of a block-ACK may include the information about the duration of the session.

According to an example embodiment, the electronic device 1002 may generate the information indicating the failure to receive the target block to additionally include information about at least one of the target MCS, the target bandwidth, and the number of target streams.

According to an example embodiment, when the information that indicates the failure to receive the target block and that includes the information about the duration of the session is received, the electronic device 1004 may immediately start a session for retransmission of the target block, instead of negotiating with the electronic device 1002. Since the session for the retransmission of the target block is immediately started, a delay caused by data retransmission may be reduced.

In operation 1070, the electronic device 1002 may transmit the information indicating the failure to receive the target block to the electronic device 1004 via the first link or the second link among at least one wireless communication link.

In operation 1080, the electronic device 1004 may transmit the target block to the electronic device 1002 via the first link or the second link. The electronic device 1002 may receive the target block from the electronic device 1004 via the first link or the second link.

According to an example embodiment, the electronic devices 1002 and 1004 may negotiate not to use the quick recovery protocol. For example, when a communication environment of the second link is deteriorated, the electronic devices 1002 and 1004 may negotiate to terminate (or deactivate) the quick recovery protocol.

According to an example embodiment, an electronic device (the electronic device 101 of FIG. 1, the electronic device 220 of FIG. 2, or the electronic device 302 of FIG. 3) may include a communication module (e.g., the communication module 190 of FIG. 1) comprising communication circuitry configured to exchange data with an external device, and at least one processor (e.g., the processor 120 of FIG. 1) operatively connected to the communication module, the at least one processor configured to control the electronic device. Through the communication module, the processor may be configured to: receive aggregated data including a plurality of data blocks via a first link (e.g., the first link 230 of FIG. 2) among a plurality of wireless communication links (e.g., the plurality of wireless communication links, e.g., the first link 230 and the second link 240 of FIG. 2) from a second electronic device (e.g., the electronic device 104 of FIG. 1, the electronic device 210 of FIG. 2, or the electronic device 304 of FIG. 3) connected to the electronic device via the plurality of wireless communication links, transmit information indicating a failure to receive a target block among the plurality of data blocks to the second electronic device via a second link (e.g., the second link 240 of FIG. 2) among the plurality of wireless communication links based on reception of the target block failing, and may receive the target block from the second electronic device via the second link.

According to an example embodiment, the information indicating the failure to receive the target block may be transmitted to the second electronic device via the second link, before a last data block of the aggregated data is received via the first link.

According to an example embodiment, the processor may be configured to: operate a preset timer based on the reception of the target block failing, transmit information indicating a failure to receive a second target block and the target block to the second electronic device via the second link, based on reception of the second target block failing before the timer expires, and receive the target block and the second target block from the second electronic device via the second link.

According to an example embodiment, the processor may be configured to: transmit the information indicating the failure to receive the target block to the second electronic device via the second link, based on reception of a block other than the target block not failing before the timer expires.

According to an example embodiment, the processor may be configured to: operate a preset timer based on the reception of the target block failing, restart the timer based on reception of a second target block failing before the timer expires, transmit information indicating a failure to receive the target block and the second target block to the second electronic device via the second link, based on reception of a block other than the target block and the second target block not failing before the timer expires, and receive the target block and the second target block from the second electronic device via the second link.

According to an example embodiment, the electronic device may further include a memory (e.g., the volatile memory 132 of FIG. 1 or the memory 402 of FIG. 4), and the first link and the second link may be configured to share the memory for an access category (AC) or a traffic identification (TID) of the aggregated data.

According to an example embodiment, the processor may be configured to: arrange at least one data block received via the first link and the target block received via the second link in the memory, based on sequence numbers.

According to an example embodiment, the processor may be configured to: determine whether the second link allows retransmission of a data block that fails to be received via the first link in a process of establishing the second link with the second electronic device, and transmit the information indicating the failure to receive the target block to the second electronic device via the second link, based on the second link allowing the retransmission of the data block.

According to an example embodiment, information about whether the second link allows the retransmission of the data block that fails to be received may be included in a beacon transmitted by the second electronic device.

According to an example embodiment, the processor may be configured to: determine a duration of a session for the reception of the target block based on the reception of the target block failing, generate the information indicating the failure to receive the target block to include information about the duration of the session, transmit the information indicating the failure to receive the target block to the second electronic device via the second link, and receive the target block from the second electronic device via the second link during the duration of the session.

According to an example embodiment, the processor may be configured to: determine the duration of the session based on at least one of a quantity of data of the target block, a transmission rate of the first link, and a transmission rate of the second link.

According to an example embodiment, the electronic device may comprise a mobile communication terminal.

According to an example embodiment, an electronic device (e.g., the electronic device 104 of FIG. 1, the electronic device 210 of FIG. 2, or the electronic device 304 of FIG. 3) may include a communication module (e.g., the communication module 190 of FIG. 1) comprising communication circuitry configured to exchange data with an external device, and at least one processor (e.g., the processor 120 of FIG. 1) operatively connected to the communication module, the at least one processor configured to control the electronic device. Through the communication module, the processor may be configured to: transmit aggregated data including a plurality of data blocks via a first link (e.g., the first link 230 of FIG. 2) among a plurality of wireless communication links (e.g., the plurality of wireless communication links, e.g., the first link 230 and the second link 240 of FIG. 2) to a second electronic device (e.g., the electronic device 101 of FIG. 1, the electronic device 220 of FIG. 2, or the electronic device 302 of FIG. 3) connected to the electronic device via the plurality of wireless communication links, receive information indicating a failure to receive a target block among the plurality of data blocks from the second electronic device via a second link (e.g., the second link 240 of FIG. 2) among the plurality of wireless communication links, and transmit the target block to the second electronic device via the second link.

According to an example embodiment, the information indicating the failure to receive the target block may be received from the second electronic device via the second link, before a last data block of the aggregated data is transmitted to the second electronic device via the first link.

According to an example embodiment, the information indicating the failure to receive the target block may include information about a duration of a session, and the processor may be configured to transmit the target block to the second electronic device via the second link during the duration of the session.

According to an example embodiment, the electronic device may further include a memory (e.g., the volatile memory 132 of FIG. 1 or the memory 404 of FIG. 4), and the first link and the second link may be configured to share the memory for an access category (AC) or a traffic identification (TID) of the aggregated data.

According to an example embodiment, the processor may be configured to: determine whether the second link allows retransmission of a data block that fails to be received via the first link in a process of establishing the second link with the second electronic device, and receive the information indicating the failure to receive the target block from the second electronic device via the second link, based on the second link allowing the retransmission of the data block.

According to an example embodiment, the electronic device may comprise an access point multi-link device (AP MLD).

According to an example embodiment, an electronic device (e.g., the electronic device 101 of FIG. 1, the electronic device 220 of FIG. 2, the electronic device 302 of FIG. 3, or the electronic device 1002 of FIG. 10) may include: a communication module (e.g., the communication module 190 of FIG. 1) comprising communication circuitry configured to exchange data with an external device, and at least one processor (e.g., the processor 120 of FIG. 1) configured to control the electronic device. Through the communication module, the processor may be configured to: receive aggregated data including a plurality of data blocks from a second electronic device (e.g., the electronic device 104 of FIG. 1, the electronic device 210 of FIG. 2, the electronic device 304 of FIG. 3, or the electronic device 1004 of FIG. 10), determine a duration of a session for retransmission of a target block among the plurality of data blocks based on reception of the target block failing, generate information indicating a failure to receive the target block to include information about the duration of the session, transmit the information indicating the failure to receive the target block to the second electronic device, and receive the target block from the second electronic device based on the duration of the session.

According to an example embodiment, the processor may be configured to: determine the duration of the session based on at least one of a quantity of data of the target block, and a transmission rate of a wireless communication link (e.g., the first link 230 and the second link 240 of FIG. 2) between electronic devices.

According to an example embodiment, the electronic device may comprise a mobile communication terminal.

According to an example embodiment, an electronic device (e.g., the electronic device 104 of FIG. 1, the electronic device 210 of FIG. 2, the electronic device 304 of FIG. 3, or the electronic device 1004 of FIG. 10) may include a communication module (e.g., the communication module 190 of FIG. 1) comprising communication circuitry configured to exchange data with an external device, and at least one processor (e.g., the processor 120 of FIG. 1) operatively connected to the communication module, the at least one processor configured to control the electronic device. Through the communication module, the processor may be configured to: transmit aggregated data including a plurality of data blocks to a second electronic device (e.g., the electronic device 101 of FIG. 1, the electronic device 220 of FIG. 2, the electronic device 302 of FIG. 3, or the electronic device 1002 of FIG. 10), receive information indicating a failure to receive a target block among the plurality of data blocks and including information about a duration of a session for retransmission of the target block from the second electronic device, and transmit the target block to the second electronic device based on the duration of the session.

According to an example embodiment, the information indicating the failure to receive the target block may include at least one of a target modulation coding scheme (MCS), a target bandwidth, and a number of target streams, and the processor may be configured to transmit the target block to the second electronic device based on at least one of the target MCS, the target bandwidth, and the number of target streams.

According to an example embodiment, the electronic device may comprise an access point multi-link device (AP MLD).

The example embodiments described herein may be implemented using a hardware component, a software component and/or a combination thereof. A processing device may be implemented using one or more general-purpose or special-purpose computers, such as, for example, and without limitation, a processor, a controller and an arithmetic logic unit (ALU), a DSP, a microcomputer, a field-programmable gate array (FPGA), a programmable logic unit (PLU), a microprocessor or any other device capable of responding to and executing instructions in a defined manner. The processing device may run an OS and one or more software applications that run on the OS. The processing device also may access, store, manipulate, process, and create data in response to execution of the software. For purpose of simplicity, the description of a processing device is used as singular; however, one skilled in the art will appreciate that a processing device may include multiple processing elements and multiple types of processing elements. For example, the processing device may include a plurality of processors, or a single processor and a single controller. In addition, different processing configurations are possible, such as parallel processors.

The software may include a computer program, a piece of code, an instruction, or some combination thereof, to independently or uniformly instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network-coupled computer systems so that the software is stored and executed in a distributed fashion. The software and data may be stored by one or more non-transitory computer-readable recording mediums.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs and/or DVDs; magneto-optical media such as optical discs; and hardware devices that are specially configured to store and perform program instructions, such as read-only memory (ROM), random access memory (RAM), flash memory, and the like. Examples of program instructions include both machine code, such as code made by a compiler, and files containing higher-level code that may include code executable by an interpreter.

The above-described devices may be configured to act as one or more software modules in order to perform the operations of the above-described examples, or vice versa.

As described above, although the example embodiments have been described with reference to the limited drawings, a person skilled in the art may apply various technical modifications and variations based thereon. For example, suitable results may be achieved if the described techniques are performed in a different order and/or if components in a described system, architecture, device, or circuit are combined in a different manner and/or replaced or supplemented by other components or their equivalents.

Therefore, other implementations, other example embodiments, and equivalents to the claims are also within the scope of the following claims.

Accordingly, while the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device comprising:
    a communication module comprising communication circuitry configured to exchange data with an external device;
    at least one processor comprising processing circuitry; and
    memory,
    wherein the memory stores instructions that, when executed by the at least one processor, cause the electronic device to:
        receive aggregated data via a first link among a plurality of wireless communication links from a second electronic device connected to the electronic device via the plurality of wireless communication links, the aggregated data comprising a plurality of data blocks;
        transmit to the second electronic device via a second link among the plurality of wireless communication links, before a last data block of the aggregated data is received via the first link, information indicating a failure to receive a target block among the plurality of data blocks based on reception of the target block failing; and
        receive the target block from the second electronic device via the second link.

2. The electronic device of claim 1, wherein the second link is used for receiving only the blocks among the plurality of data blocks that were not received via the first link.

3. The electronic device of claim 1, wherein when executed by the at least one processor, the instructions cause the electronic device to:
    operate a preset timer based on the reception of the target block failing;
    transmit information indicating a failure to receive a second target block and the target block to the second electronic device via the second link, based on reception of the second target block failing before the timer expires; and
    receive the target block and the second target block from the second electronic device via the second link.

4. The electronic device of claim 3, wherein when executed by the at least one processor, the instructions cause the electronic device to transmit the information indicating the failure to receive the target block to the second electronic device via the second link, based on reception of a block other than the target block not failing before the timer expires.

5. The electronic device of claim 1, wherein when executed by the at least one processor, the instructions cause the electronic device to:
operate a preset timer based on the reception of the target block failing;
restart the timer based on reception of a second target block failing before the timer expires;
transmit information indicating a failure to receive the target block and the second target block to the second electronic device via the second link, based on reception of a block other than the target block and the second target block not failing before the timer expires; and
receive the target block and the second target block from the second electronic device via the second link.

6. The electronic device of claim 1, wherein the first link and the second link are configured to share the memory for an access category (AC) or a traffic identification (TID) of the aggregated data.

7. The electronic device of claim 6, wherein when executed by the at least one processor, the instructions cause the electronic device to arrange at least one data block received via the first link and the target block received via the second link in the memory based on sequence numbers.

8. The electronic device of claim 1, wherein when executed by the at least one processor, the instructions cause the electronic device to:
determine whether the second link allows retransmission of a data block that fails to be received via the first link in a process of establishing the second link with the second electronic device; and
transmit the information indicating the failure to receive the target block to the second electronic device via the second link, based on the second link allowing the retransmission of the data block.

9. The electronic device of claim 8, wherein information about whether the second link allows the retransmission of the data block that fails to be received is included in a beacon transmitted by the second electronic device.

10. The electronic device of claim 1, wherein when executed by the at least one processor, the instructions cause the electronic device to:
determine a duration of a session for the reception of the target block based on the reception of the target block failing;
generate the information indicating the failure to receive the target block to include information about the duration of the session;
transmit the information indicating the failure to receive the target block to the second electronic device via the second link; and
receive the target block from the second electronic device via the second link during the duration of the session.

11. The electronic device of claim 10, wherein when executed by the at least one processor, the instructions cause the electronic device to determine the duration of the session based on at least one of a quantity of data of the target block, a transmission rate of the first link, and a transmission rate of the second link.

12. An electronic device comprising:
a communication module comprising communication circuitry configured to exchange data with an external device;
at least one processor comprising processing circuitry; and
memory,
wherein the memory stores instructions that, when executed by the at least one processor, cause the electronic device to:
transmit aggregated data via a first link among a plurality of wireless communication links to a second electronic device connected to the electronic device via the plurality of wireless communication links, the aggregated data comprising a plurality of data blocks;
receive information indicating a failure to receive a target block among the plurality of data blocks from the second electronic device via a second link among the plurality of wireless communication links; and
transmit the target block to the second electronic device via the second link,
wherein the information indicating the failure to receive the target block is received from the second electronic device via the second link before a last data block of the aggregated data is transmitted to the second electronic device via the first link.

13. The electronic device of claim 12, wherein the second link is used for receiving only the blocks among the plurality of data blocks that were not received via the first link.

14. The electronic device of claim 12, wherein
the information indicating the failure to receive the target block comprises information about a duration of a session, and
wherein when executed by the at least one processor, the instructions cause the electronic device to transmit the target block to the second electronic device via the second link during the duration of the session.

15. The electronic device of claim 12, wherein the first link and the second link are configured to share the memory for an access category (AC) or a traffic identification (TID) of the aggregated data.

16. The electronic device of claim 12, wherein when executed by the at least one processor, the instructions cause the electronic device to:
determine whether the second link allows retransmission of a data block that fails to be received via the first link in a process of establishing the second link with the second electronic device; and
receive the information indicating the failure to receive the target block from the second electronic device via the second link, based on the second link allowing the retransmission of the data block.

17. An electronic device comprising:
a communication module comprising communication circuitry configured to exchange data with an external device;
at least one processor comprising processing circuitry; and
memory,
the memory stores instructions that, when executed by the at least one processor, cause the electronic device to:
receive aggregated data via a first link among a plurality of wireless communication links from a second electronic device, the aggregated data comprising a plurality of data blocks;

determine a duration of a session for retransmission of a target block among the plurality of data blocks when reception of the target block fails;

generate information indicating a failure to receive the target block to include information about the duration of the session;

transmit the information indicating the failure to receive the target block to the second electronic device via a second link among the plurality of wireless communication links, before a last data block of the aggregated data is received via the first link; and receive the target block from the second electronic device via the second link based on the duration of the session.

18. The electronic device of claim 17, the memory stores instructions that, when executed by the at least one processor, cause the electronic device to determine the duration of the session based on at least one of a quantity of data of the target block, and a transmission rate of a wireless communication link between electronic devices.

19. An electronic device comprising:
a communication module comprising communication circuitry configured to exchange data with an external device;
at least one processor comprising processing circuitry; and
memory,
the memory stores instructions that, when executed by the at least one processor, cause the electronic device to:
transmit aggregated data via a first link among a plurality of wireless communication links to a second electronic device, the aggregated data comprising a plurality of data blocks;
receive information indicating a failure to receive a target block among the plurality of data blocks from the second electronic device via a second link among the plurality of wireless communication links, before a last data block of the aggregated data is transmitted via the first link, the information indicating the failure including information about a duration of a session for retransmission of the target block; and
transmit the target block to the second electronic device via the second link based on the duration of the session.

20. The electronic device of claim 19, wherein
the information indicating the failure to receive the target block comprises at least one of a target modulation coding scheme (MCS), a target bandwidth, and a number of target streams, and
the memory stores instructions that, when executed by the at least one processor, cause the electronic device to transmit the target block to the second electronic device based on at least one of the target MCS, the target bandwidth, and the number of target streams.

\* \* \* \* \*